United States Patent
Xia et al.

(10) Patent No.: US 9,985,765 B2
(45) Date of Patent: May 29, 2018

(54) DATA TRANSMISSION METHOD, USER EQUIPMENT, AND BASE STATION

(71) Applicant: Huawei Technologies Co., Ltd., Shenzhen, Guangdong (CN)

(72) Inventors: Liang Xia, Shenzhen (CN); Jingyuan Sun, Beijing (CN); Yongxing Zhou, Beijing (CN); Xiaotao Ren, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 267 days.

(21) Appl. No.: 14/461,725

(22) Filed: Aug. 18, 2014

(65) Prior Publication Data

US 2014/0355548 A1    Dec. 4, 2014

Related U.S. Application Data

(63) Continuation of application No. PCT/CN2013/071212, filed on Jan. 31, 2013.

(30) Foreign Application Priority Data

Feb. 20, 2012   (CN) .......................... 2012 1 0038483

(51) Int. Cl.
*H04W 4/00*     (2018.01)
*H04L 5/00*     (2006.01)
*H04W 72/04*    (2009.01)

(52) U.S. Cl.
CPC .......... *H04L 5/0053* (2013.01); *H04L 5/0051* (2013.01); *H04L 5/0094* (2013.01);
(Continued)

(58) Field of Classification Search
CPC ............ H04L 5/0053; H04W 72/0453; H04W 5/0057; H04W 5/0035
(Continued)

(56) References Cited

U.S. PATENT DOCUMENTS 8,953,699 B2 * 2/2015 Sayana .................. H04B 7/024
                                            370/252
9,148,818 B2 * 9/2015 Yue ......................... H04L 5/001
                          (Continued)

FOREIGN PATENT DOCUMENTS

CN      101873629 A    10/2010
EP      2 573 953 A2    3/2013
                 (Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 v10.4.0, Dec. 2011, 296 pages.
(Continued)

*Primary Examiner* — Faisal Choudhury
(74) *Attorney, Agent, or Firm* — Leydig, Voit & Mayer, Ltd.

(57) ABSTRACT

Embodiments of the present invention provide a data transmission method, a user equipment, and a base station. The method includes: obtaining a resource element RE configuration, where an RE indicated by the RE configuration is a subset of the RE available for sending a channel state information reference signal CSI-RS and is the RE onto which a data symbol can be mapped; and receiving, according to the RE configuration, the data symbol that is sent by a base station on the RE indicated by the RE configuration. In the embodiments of the present invention, a data symbol can be mapped onto the RE that is used for sending the CSI-RS, so that a UE can receive the data symbol on the RE that is used for sending the CSI-RS, thereby improving the utilization efficiency of the RE.

4 Claims, 9 Drawing Sheets

(52) U.S. Cl.
CPC .......... *H04L 5/0035* (2013.01); *H04L 5/0057* (2013.01); *H04W 72/0453* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2011/0170435 | A1* | 7/2011 | Kim | H04L 5/0023 370/252 |
| 2012/0039216 | A1 | 2/2012 | Li et al. | |
| 2012/0058791 | A1* | 3/2012 | Bhattad | H04L 1/0606 455/509 |
| 2012/0076106 | A1* | 3/2012 | Bhattad | H04L 5/0035 370/330 |
| 2012/0106374 | A1* | 5/2012 | Gaal | H04L 5/0048 370/252 |
| 2012/0201163 | A1* | 8/2012 | Jongren | H04W 24/10 370/252 |
| 2012/0208547 | A1* | 8/2012 | Geirhofer | H04B 7/0626 455/452.2 |
| 2013/0028109 | A1* | 1/2013 | Jongren | H04W 16/32 370/252 |
| 2013/0077518 | A1 | 3/2013 | Abe et al. | |
| 2014/0185527 | A1* | 7/2014 | Kim | H04L 5/0044 370/328 |
| 2014/0219152 | A1* | 8/2014 | Anto | H04W 52/08 370/311 |
| 2014/0286219 | A1* | 9/2014 | Siomina | H04J 11/0023 370/311 |

FOREIGN PATENT DOCUMENTS

| | | |
|---|---|---|
| JP | 2013527644 A | 6/2013 |
| WO | WO 2010/123270 A2 | 10/2010 |
| WO | WO 2011/115421 A2 | 9/2011 |
| WO | WO 2011/126025 A1 | 10/2011 |
| WO | WO 2011/145886 A2 | 11/2011 |
| WO | WO 2012/021018 A2 | 2/2012 |

OTHER PUBLICATIONS

"Discussion on interference measurement for CoMP", NEC Group, 3GPP TSG RAN WG1 Meeting #68, Feb. 6-10, 2012, 5 pages.
"3rd Generation Partnership Project; Technical Specification Group Radio Access Network; Evolved Universal Terrestrial Radio Access (E-UTRA); Physical Channels and Modulation (Release 10)", 3GPP TS 36.211 v10.4.0, Dec. 2011, 101 pages.
"3rd Generation Partnership Project; Technical Specification Group Radio Access Network; Evolved Universal Terrestrial Radio Access (E-UTRA); Physical layer procedures (Release 10)", 3GPP TS 36.213 v10.4.0, Dec. 2011, 125 pages.
"Discussion on CSI-RS configuration for Rel-11", Pantech, 3GPP TSG RAN WG1 Meeting #66-bis, Oct. 10-14, 2011, 4 pages.
"CSI-RS Patterns for Interference Measurements for CoMP", Fujitsu, 3GPP TSG-RAN WG1 #68, Feb. 6-10, 2012, 8 pages.

* cited by examiner

DATA TRANSMISSION METHOD, USER EQUIPMENT, AND BASE STATION

CROSS-REFERENCE TO RELATED APPLICATIONS

This application is a continuation of International Application No. PCT/CN2013/071212, filed on Jan. 31, 2013, which claims priority to Chinese Patent Application No. 201210038483.5, filed on Feb. 20, 2012, both of which are hereby incorporated by reference in their entireties.

TECHNICAL FIELD

The present invention relates to the communications field, and in particular, to a data transmission method, a user equipment, and a base station.

BACKGROUND

In a radio communications system, in order for a UE (user equipment) to measure a downlink channel and obtain downlink CSI (channel state information), a base station needs to send an RS (reference signal) to the UE in a coverage area. For example, in a 3GPP (the 3rd generation partnership project) LTE (long term evolution) R (release) 10 protocol, the base station needs to send a non-zero-power CSI-RS (channel state information reference signal) to the UE in the coverage area so that the UE can measure the downlink channel. The base station may also send a zero-power CSI-RS to avoid interference onto the non-zero-power CSI-RS of a neighboring cell. In the existing LTE R10 protocol, the base station sends a non-zero-power CSI-RS and a zero-power CSI-RS to the UE on an RE (resource element). When the number of REs occupied by the non-zero-power CSI-RS and the zero-power CSI-RS increases, the number of REs for transmitting data symbols decreases, which leads to a low utilization efficiency of the REs.

SUMMARY

Embodiments of the present invention provide a data transmission method, a user equipment, and a base station to improve a utilization efficiency of an RE.

According to a first aspect, a data transmission method is provided, including: obtaining a resource element RE configuration, where an RE indicated by the RE configuration is a subset of the RE available for sending a channel state information reference signal CSI-RS and is the RE onto which a data symbol can be mapped; and receiving, according to the RE configuration, the data symbol that is sent by a base station on the RE indicated by the RE configuration.

In a first possible implementation manner of the first aspect, the obtaining the RE configuration includes:
knowing an index corresponding to a second RE configuration in a currently transmitted subframe according to dynamic signaling sent by the base station;
knowing that an RE indicated by the second RE configuration corresponding to the index in the currently transmitted subframe is the RE for sending the CSI-RS but is the RE onto which the data symbol cannot be mapped; and
obtaining, according to the second RE configuration in the currently transmitted subframe, the RE configuration indicating the RE onto which the data symbol can be mapped.

With reference to the first aspect or the first possible implementation manner of the first aspect, in a second possible implementation manner, the receiving the data symbol that is sent by a base station on the RE indicated by the RE configuration includes:
receiving the data symbol that is sent by the base station through at least one first access point AP on the RE indicated by the RE configuration; and
the method further includes:
receiving the CSI-RS that is sent by the base station through at least one second AP on the RE indicated by the RE configuration, where the at least one first AP and the at least one second AP are multiple coordinated APs in a coordinated multi-point transmission and reception system; and
measuring, according to the CSI-RS, interference caused by the at least one first AP onto the at least one second AP.

With reference to the first aspect or any one possible implementation manner of the first aspect, in a third possible implementation manner, the obtaining the RE configuration includes:
receiving higher layer signaling that carries the RE configuration and is sent by the base station, and obtaining the RE configuration according to the higher layer signaling; or
obtaining the RE configuration that is predefined.

With reference to the first aspect or any one possible implementation manner of the first aspect, in a fourth possible implementation manner, the obtaining the RE configuration includes:
receiving higher layer signaling that carries multiple RE configurations and corresponding indexes and is sent by the base station;
receiving dynamic signaling that carries a first index corresponding to the RE configurations and is sent by the base station; and
obtaining, according to the first index, the RE configuration from an RE configuration set that includes the multiple RE configurations.

With reference to the first aspect or any one possible implementation manner of the first aspect, in a fifth possible implementation manner, the obtaining the RE configuration includes:
receiving higher layer signaling that carries at least one first RE configuration and a corresponding index and is sent by the base station;
receiving dynamic signaling that carries a first index corresponding to the RE configurations and is sent by the base station; and
obtaining, according to the first index, the RE configuration from an RE configuration set that includes the at least one first RE configuration and at least one second RE configuration, where the at least one second RE configuration and the corresponding index are predefined.

With reference to the first aspect or any one possible implementation manner of the first aspect, in a sixth possible implementation manner, the obtaining the RE configuration includes:
receiving dynamic signaling that carries a first index corresponding to the RE configuration and is sent by the base station; and
obtaining, according to the first index, the RE configuration from an RE configuration set that includes at least one RE configuration, where the at least one RE configuration and the corresponding index are predefined.

With reference to the first aspect or any one possible implementation manner of the first aspect, in a seventh possible implementation manner, the method further includes:

performing demodulation and channel decoding on the data symbol by using the data symbol as a useful data symbol or a useless data symbol.

With reference to the seventh possible implementation manner of the first aspect, in an eighth possible implementation manner, the performing demodulation and channel decoding on the data symbol by using the data symbol as a useful data symbol or a useless data symbol includes:

performing demodulation and channel decoding on the data symbol by using, according to dynamic signaling sent by the base station, the data symbol as a useful data symbol or a useless data symbol, where the dynamic signaling is used to indicate whether the data symbol is a useful data symbol or a useless data symbol.

With reference to the first aspect or any one possible implementation manner of the first aspect, in a ninth possible implementation manner, the higher layer signaling includes a bitmap code, where bits in the bitmap code correspond to a pilot pattern of the CSI-RS, and the number of antenna ports corresponding to the pilot pattern of the CSI-RS is 1, 2, 4, or 8.

With reference to the first aspect or any one possible implementation manner of the first aspect, in a tenth possible implementation manner, the CSI-RS is a zero-power CSI-RS or a non-zero-power CSI-RS.

With reference to the first aspect or any one possible implementation manner of the first aspect, in an eleventh possible implementation manner, the RE configuration includes a cycle and a subframe offset.

According to a second aspect, a data transmission method is provided, including: notifying a resource element RE configuration to a user equipment UE, where an RE indicated by the RE configuration is a subset of the RE available for sending a channel state information reference signal CSI-RS and is the RE onto which a data symbol can be mapped; and sending, according to the RE configuration, the data symbol to the UE on the RE indicated by the RE configuration.

In a first possible implementation manner of the second aspect, the notifying the RE configuration to the UE includes:

sending dynamic signaling to the UE to notify the UE of the RE configuration, where the dynamic signaling is for the UE to know an index corresponding to a second RE configuration in a currently transmitted subframe and to know that an RE indicated by the second RE configuration corresponding to the index in the currently transmitted subframe is the RE for sending the CSI-RS but is the RE onto which the data symbol cannot be mapped; and, for the UE to obtain, according to the second RE configuration in the currently transmitted subframe, the RE configuration indicating the RE onto which the data symbol can be mapped.

With reference to the second aspect or the first possible implementation manner of the second aspect, in a second possible implementation manner, the sending the data symbol to the UE on the RE indicated by the RE configuration includes:

sending the data symbol to the UE through at least one first access point AP on the RE indicated by the RE configuration; and the method further includes:

sending the CSI-RS to the UE through at least one second AP on the RE indicated by the RE configuration, where the at least one first AP and the at least one second AP are multiple coordinated APs in a coordinated multi-point transmission and reception system.

With reference to the second aspect or any one possible implementation manner of the second aspect, in a third possible implementation manner, the notifying the RE configuration to the UE includes:

sending higher layer signaling that carries the RE configuration to the UE.

With reference to the second aspect or any one possible implementation manner of the second aspect, in a fourth possible implementation manner, the notifying the RE configuration to the UE includes:

sending higher layer signaling that carries multiple RE configurations and corresponding indexes to the UE; and sending dynamic signaling that carries a first index corresponding to the RE configuration to the UE, where the RE configuration belongs to an RE configuration set that includes the multiple RE configurations.

With reference to the second aspect or any one possible implementation manner of the second aspect, in a fifth possible implementation manner, the notifying the RE configuration to the UE includes:

sending higher layer signaling that carries at least one first RE configuration and a corresponding index to the UE; and sending dynamic signaling that carries a first index corresponding to the RE configuration to the UE, where the RE configuration belongs to an RE configuration set that includes the at least one first RE configuration and at least one second RE configuration, where the at least one second RE configuration and the corresponding index are pre-defined.

With reference to the second aspect or any one possible implementation manner of the second aspect, in a sixth possible implementation manner, the notifying an RE configuration to a UE includes:

sending dynamic signaling that carries a first index corresponding to the RE configuration to the UE, where the RE configuration belongs to an RE configuration set that includes at least one RE configuration, where the at least one RE configuration and the corresponding index are pre-defined.

With reference to the second aspect or any one possible implementation manner of the second aspect, in a seventh possible implementation manner, the sending the data symbol to the UE on the RE indicated by the RE configuration includes:

mapping the data symbol onto the RE indicated by each RE configuration in the RE configuration set; and deleting, according to transmission requirements of the CSI-RS, the data symbols mapped onto other RE than the RE indicated by the RE configuration in the RE indicated by each RE configuration.

With reference to the second aspect or any one possible implementation manner of the second aspect, in an eighth possible implementation manner, the higher layer signaling includes a bitmap code, where bits in the bitmap code correspond to a pilot pattern of the CSI-RS, and the number of antenna ports corresponding to the pilot pattern of the CSI-RS is 1, 2, 4, or 8.

With reference to the second aspect or any one possible implementation manner of the second aspect, in a ninth possible implementation manner, the CSI-RS is a zero-power CSI-RS or a non-zero-power CSI-RS.

With reference to the second aspect or any one possible implementation manner of the second aspect, in a tenth possible implementation manner, the RE configuration includes a cycle and a subframe offset.

According to a third aspect, a user equipment is provided, including: an obtaining unit, configured to obtain a resource element RE configuration, where an RE indicated by the RE configuration is a subset of the RE available for sending a channel state information reference signal CSI-RS and is the RE onto which a data symbol can be mapped; and a receiving unit, configured to receive, according to the RE configuration, the data symbol that is sent by a base station on the RE indicated by the RE configuration.

In a first possible implementation manner of the third aspect, the obtaining unit is specifically configured to obtain the RE configuration as follows:

knowing an index corresponding to a second RE configuration in a currently transmitted subframe according to dynamic signaling sent by the base station;

knowing that an RE indicated by the second RE configuration corresponding to the index in the currently transmitted subframe is the RE for sending the CSI-RS but is the RE onto which the data symbol cannot be mapped; and obtaining, according to the second RE configuration in the currently transmitted subframe, the RE configuration indicating the RE onto which the data symbol can be mapped.

With reference to the third aspect or the first possible implementation manner of the third aspect, in a second possible implementation manner, the user equipment further includes a measuring unit, the receiving unit is specifically configured to receive the data symbol that is sent by the base station through at least one first access point AP on the REs indicated by the RE configuration;

the receiving unit is further configured to receive the CSI-RS that is sent by the base station through at least one second AP on the REs indicated by the RE configuration, where the at least one first AP and the at least one second AP are multiple coordinated APs in a coordinated multi-point transmission and reception system; and the measuring unit is specifically configured to measure, according to the CSI-RS, interference caused by the at least one first AP onto the at least one second AP.

With reference to the third aspect or any one possible implementation manner of the third aspect, in a third possible implementation manner, the obtaining unit is specifically configured to receive higher layer signaling that carries the RE configuration and is sent by the base station, and obtain the RE configuration according to the higher layer signaling; or the obtaining unit is specifically configured to obtain the RE configuration that is predefined.

With reference to the third aspect or any one possible implementation manner of the third aspect, in a fourth possible implementation manner, the obtaining unit is specifically configured to receive higher layer signaling that carries multiple RE configurations and corresponding indexes and is sent by the base station; receive dynamic signaling that carries a first index corresponding to the RE configuration and is sent by the base station; and obtain the RE configuration from an RE configuration set that includes the multiple RE configurations according to the first index.

With reference to the third aspect or any one possible implementation manner of the third aspect, in a fifth possible implementation manner, the obtaining unit is specifically configured to receive higher layer signaling that carries at least one first RE configuration and a corresponding index and is sent by the base station; receive dynamic signaling that carries a first index corresponding to the RE configuration and is sent by the base station; and obtain the RE configuration from an RE configuration set that includes the at least one first RE configuration and at least one second RE configuration according to the first index, where the at least one second RE configuration and the corresponding index are predefined.

With reference to the third aspect or any one possible implementation manner of the third aspect, in a sixth possible implementation manner, the obtaining unit is specifically configured to receive dynamic signaling that carries a first index corresponding to the RE configuration and is sent by the base station; and obtain, according to the first index, the RE configuration from an RE configuration set that includes at least one RE configuration, where the at least one RE configuration and the corresponding index are predefined.

With reference to the third aspect or any one possible implementation manner of the third aspect, in a seventh possible implementation manner, the user equipment further includes a processing unit, configured to perform demodulation and channel decoding on the data symbol by using the data symbol as a useful data symbol or a useless data symbol.

With reference to the third aspect or any one possible implementation manner of the third aspect, in an eighth possible implementation manner, the processing unit is specifically configured to perform demodulation and channel decoding on the data symbol by using, according to dynamic signaling sent by the base station, the data symbol as a useful data symbol or a useless data symbol, where the dynamic signaling is used to indicate whether the data symbol is a useful data symbol or a useless data symbol.

With reference to the third aspect or any one possible implementation manner of the third aspect, in a ninth possible implementation manner, the higher layer signaling includes a bitmap code, where bits in the bitmap code correspond to a pilot pattern of the CSI-RS, and the number of antenna ports corresponding to the pilot pattern of the CSI-RS is 1, 2, 4, or 8.

With reference to the third aspect or any one possible implementation manner of the third aspect, in a tenth possible implementation manner, the CSI-RS is a zero-power CSI-RS or a non-zero-power CSI-RS.

With reference to the third aspect or any one possible implementation manner of the third aspect, in an eleventh possible implementation manner, the RE configuration includes a cycle and a subframe offset.

According to a fourth aspect, a base station is provided, including: a notification unit, configured to notify a resource element RE configuration to a user equipment UE, where an RE indicated by the RE configuration is a subset of the RE available for sending a channel state information reference signal CSI-RS and is the RE onto which a data symbol can be mapped; and a sending unit, configured to send, according to the RE configuration, the data symbols to the UE on the REs indicated by the RE configuration.

In a first possible implementation manner of the fourth aspect, the notification unit is specifically configured to notify the RE configuration to the UE as follows:

sending dynamic signaling to the UE to notify the UE of the RE configuration, where the dynamic signaling is for the UE to know an index corresponding to a second RE configuration in a currently transmitted subframe and to know that an RE indicated by the second RE configuration corresponding to the index in the currently transmitted subframe is the RE for sending the CSI-RS but is the RE onto which the data symbol cannot be mapped; and, for the UE to obtain, according to the second RE configuration in the currently transmitted subframe, the RE configuration indicating the RE onto which the data symbol can be mapped.

With reference to the fourth aspect or the first possible implementation manner of the fourth aspect, in a second possible implementation manner, the sending unit is specifically configured to send the data symbols to the UE through at least one first access point AP on the REs indicated by the RE configuration; and the sending unit is further configured to send the CSI-RS to the UE through at least one second AP on the REs indicated by the RE configuration, where the at least one first AP and the at least one second AP are multiple coordinated APs in a coordinated multi-point transmission and reception system.

With reference to the fourth aspect or any one possible implementation manner of the fourth aspect, in a third possible implementation manner, the notification unit is specifically configured to send higher layer signaling that carries the RE configuration to the UE.

With reference to the fourth aspect or any one possible implementation manner of the fourth aspect, in a fourth possible implementation manner, the notification unit is specifically configured to send higher layer signaling that carries multiple RE configurations and corresponding indexes to the UE; and send dynamic signaling that carries a first index corresponding to the RE configuration to the UE, where the RE configuration belongs to an RE configuration set that includes the multiple RE configurations.

With reference to the fourth aspect or any one possible implementation manner of the fourth aspect, in a fifth possible implementation manner, the notification unit is specifically configured to send higher layer signaling that carries at least one first RE configuration and a corresponding index to the UE; and send dynamic signaling that carries a first index corresponding to the RE configuration to the UE, where the RE configuration belongs to an RE configuration set that includes the at least one first RE configuration and at least one second RE configuration, where the at least one second RE configuration and the corresponding index are predefined.

With reference to the fourth aspect or any one possible implementation manner of the fourth aspect, in a sixth possible implementation manner, the notification unit is specifically configured to send dynamic signaling that carries a first index corresponding to the RE configuration to the UE, where the RE configuration belongs to an RE configuration set that includes at least one RE configuration, where the at least one RE configuration and the corresponding index are predefined.

With reference to the fourth aspect or any one possible implementation manner of the fourth aspect, in a seventh possible implementation manner, the sending unit is specifically configured to map the data symbol onto the RE indicated by each RE configuration in the RE configuration set; and delete, according to transmission requirements of the CSI-RS, the data symbols mapped onto other RE than the RE indicated by the RE configuration in the RE indicated by each RE configuration.

With reference to the fourth aspect or any one possible implementation manner of the fourth aspect, in an eighth possible implementation manner, the higher layer signaling includes a bitmap code, where bits in the bitmap code correspond to a pilot pattern of the CSI-RS, and the number of antenna ports corresponding to the pilot pattern of the CSI-RS is 1, 2, 4, or 8.

With reference to the fourth aspect or any one possible implementation manner of the fourth aspect, in a ninth possible implementation manner, the CSI-RS is a zero-power CSI-RS or a non-zero-power CSI-RS.

With reference to the fourth aspect or any one possible implementation manner of the fourth aspect, in a tenth possible implementation manner, the RE configuration includes a cycle and a subframe offset.

In the embodiments of the present invention, a data symbol can be mapped onto the RE that is used for sending the CSI-RS, so that the UE can receive the data symbol on the RE that is used for sending the CSI-RS, thereby improving the utilization efficiency of the RE.

BRIEF DESCRIPTION OF THE DRAWINGS

To describe the technical solutions in the embodiments of the present invention more clearly, the following briefly introduces the accompanying drawings required by the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions of the present invention can be applied to various communication systems that use a UE-specific CSI-RS configuration, for example, a global system for mobile communication (GSM), a code division multiple access (CDMA) system, a wideband code division multiple access (WCDMA) system, a general packet radio service (GPRS) system, a long term evolution (LTE) system, and so on.

A user equipment (UE), also known as a mobile terminal (MT) or a mobile user equipment or the like, can communicate with one or more core networks through a radio access network (for example, Radio Access Network, RAN). The user equipment may be a mobile terminal such as a mobile phone (or known as a "cellular" phone) or a computer with a mobile terminal. For example, the user equipment may be a portable mobile device, a pocket mobile device, a handheld mobile device, a mobile device built in a computer, or an onboard mobile device. They exchange languages and/or data with the radio access network.

A base station may be a base station (BTS) in GSM or CDMA, or a base station (for example, NodeB) in WCDMA, or an evolved base station (for example, eNB, evolved Node B) in LTE, which is not limited herein.

Figure 1:
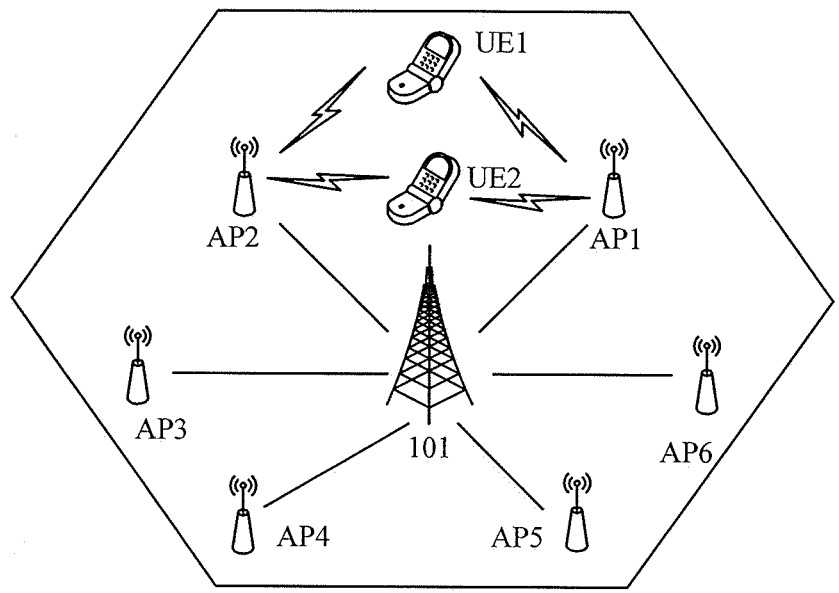
FIG. 1 is a schematic diagram of an exemplary scenario applicable to the embodiments of the present invention.

FIG. 1 is a schematic diagram of an exemplary scenario applicable to the embodiments of the present invention.

The application scenario in FIG. 1 may be a distributed antenna system (DAS) using a coordinated multi-point transmission and reception (CoMP) technology. In a DAS, multiple access points (AP) may provide data services for one or more UEs simultaneously.

As shown in FIG. 1, the application scenario includes one macro base station 101 and six dispersedly placed APs: AP 1, AP 2, AP 3, AP 4, AP 5, and AP 6. Each one of the APs in AP 1 to AP 6 has one or more antennas, and they share a same cell identification (Cell ID). AP 1 to AP 6 may coordinate to provide data services for one or more UEs. For example, AP 1 and AP 2 may provide data services for UE 1 and UE 2 simultaneously. For ease of illustration, FIG. 1 illustrates only a scenario that AP 1 and AP 2 can provide data services for UE 1 and UE 2 simultaneously, which shall not be construed as a limitation to the scope of the embodiments of the present invention. For example, in FIG. 1, the APs that provide data services for UE 1 and UE 2 simultaneously may be at least two of AP 1 to AP 6.

It should be noted that although FIG. 1 illustrates only six APs and two UEs for ease of illustration, the number of APs and the number of UEs in the embodiments of the present invention are not limited to the illustrated number, and there may be one or more APs and one or more UEs.

It should be understood that in the embodiment of the present invention, the AP may be a cell, or an AP corresponding to the cell, or a remote radio head (RRH), or a radio remote unit (RRU), or an antenna unit (AU). The embodiments of the present invention do not limit the type of the AP. For ease of description, the term "AP" is used uniformly in the description herein, which, however, shall not limit the scope of the embodiments of the present invention.

Figure 2:
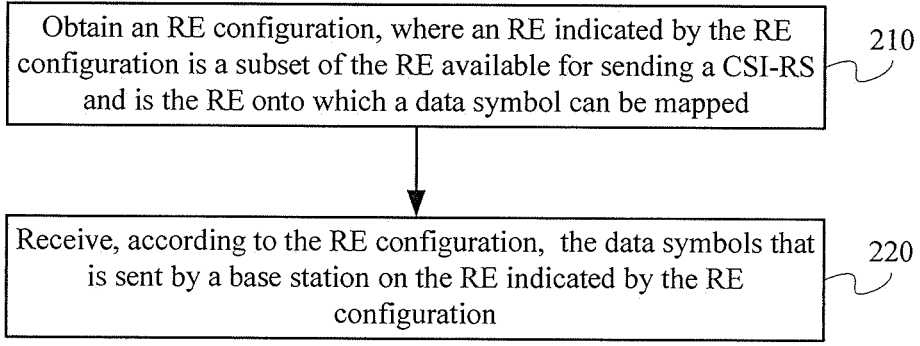
FIG. 2 is a schematic flowchart of a data transmission method according to an embodiment of the present invention.

FIG. 2 is a schematic flowchart of a data transmission method according to an embodiment of the present invention. The method in FIG. 2 is implemented by a UE, for example, by UE 1 or UE 2 in FIG. 1.

210. Obtain an RE configuration, where an RE indicated by the RE configuration is a subset of the RE available for sending a CSI-RS and is the RE onto which a data symbol can be mapped.

There may be one or more RE configurations available to the UE, which is not limited by the embodiment of the present invention. The RE indicated by the RE configuration is a subset of the RE available for sending the CSI-RS. The subset here may be a broad-sense subset, that is, the RE indicated by the RE configuration may be a part of REs available for sending the CSI-RS, or all of REs available for sending the CSI-RS, which is not limited by the embodiment of the present invention.

220. Receive, according to the RE configuration, the data symbol that is sent by a base station on the RE indicated by the RE configuration.

In the embodiment of the present invention, a data symbol can be mapped onto the RE that is used for sending the CSI-RS, so that the UE can receive the data symbol on the RE that is used for sending the CSI-RS, thereby improving the utilization efficiency of the RE.

In a CoMP system, multiple APs may provide data services for one or more UEs simultaneously. For example, AP 1 and AP 2 in FIG. 1 may provide data services for UE 1 and UE 2 simultaneously. The UE that receives a CoMP service may measure a downlink channel between the UE and the AP according to the CSI-RS. In addition, the UE needs to measure interference according to the CSI-RS. However, in the prior art, the UE cannot measure the interference between the APs according to the CSI-RS, which leads to inaccurate interference measurement and affects channel quality indicator (CQI) precision, and further affects quality of service for the UE and system throughput.

Optionally, in another embodiment, in step 220, the UE may receive the data symbol that is sent by the base station through at least one first AP on the REs indicated by the RE configuration. In this case, the UE may further receive the CSI-RS that is sent by the base station through at least one second AP on the REs indicated by the RE configuration, where the at least one first AP and the at least one second AP are multiple coordinated APs in a CoMP system. Interference caused by the at least one first AP onto the at least one second AP may be measured according to the CSI-RS. For example, the UE may compare an expected received value of the CSI-RS with an actual value of the received CSI-RS subjected to data symbol interference, and obtain the interference caused by the at least one first AP onto the at least one second AP.

Therefore, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

Optionally, in another embodiment, the CSI-RS may be a zero-power CSI-RS or a non-zero-power CSI-RS. Specifically, the CSI-RS may be used to measure a downlink channel or measure interference. The CSI-RS for measuring a downlink channel is a non-zero-power CSI-RS, and the CSI-RS for measuring interference may be a zero-power CSI-RS or a non-zero-power CSI-RS.

Optionally, in another embodiment, in step 201, the UE may receive higher layer signaling that carries the RE configuration and is sent by the base station, and may obtain the RE configuration according to the higher layer signaling, or, the UE may obtain the RE configuration that is predefined.

It should be noted that the UE may receive one or more pieces of higher layer signaling semi-statically sent by the base station, which is not limited by the embodiment of the present invention. In addition, the RE configuration may be predefined by the UE and the base station. For example, the UE may predefine the RE configuration as an RE configuration indicating the RE that has been notified by the base station to the UE and that is a subset of the RE available for sending the CSI-RS. For example, as predefined, the RE indicated by the RE configuration may be all of REs used for sending the CSI-RS and already notified by the base station to the UE, or all of REs corresponding to the CSI-RS used for measuring interference, or a null set. It should be noted that the subset here may be a broad-sense subset, including a null set or all or part of REs available for sending the CSI-RS. The RE configuration is predefined, that is, known to both the base station and the UE, and does not need to be notified by the base station to the UE by using additional higher layer signaling, thereby saving signaling overhead.

Optionally, in another embodiment, in step 210, the UE may receive higher layer signaling that carries multiple RE configurations and corresponding indexes and is sent by the base station; receive dynamic signaling that carries a first index corresponding to the RE configuration and is sent by the base station; and obtain the RE configuration from an RE configuration set that includes the multiple RE configurations according to the first index.

In dynamic point selection (DPS), the AP that provides data services for the UE may change dynamically between multiple APs, and the RE configuration may also change dynamically. Therefore, the UE may obtain an RE configuration set by using one or more pieces of higher layer signaling semi-statically sent by the base station, and then obtain the RE configuration in a currently transmitted subframe dynamically according to the dynamic signaling sent by the base station.

Optionally, in another embodiment, in step 210, the UE may receive higher layer signaling that carries at least one first RE configuration and a corresponding index and is sent by the base station. The UE may receive dynamic signaling that carries a first index corresponding to the RE configurations and is sent by the base station. According to the first index, the UE obtains the RE configuration from an RE configuration set that includes the at least one first RE configuration and at least one second RE configuration, where the at least one second RE configuration and the corresponding index are predefined. The at least one first RE configuration and the at least one second RE configuration differ from each other.

In DPS, the AP that provides data services for the UE may change dynamically between multiple APs, and the RE configuration may also change dynamically. Therefore, the UE may obtain at least one first RE configuration by using one or more pieces of higher layer signaling semi-statically sent by the base station. In addition, at least one second RE configuration is predefined so that the UE obtains an RE configuration set that includes at least one first RE configuration and at least one second RE configuration. Then, the UE can obtain the RE configuration dynamically in a currently transmitted subframe according to the dynamic signaling sent by the base station. In addition, the at least one second RE configuration is predefined, that is, known to both the base station and the UE, and does not need to be notified by the base station to the UE by using additional higher layer signaling, thereby saving signaling overhead.

Optionally, in another embodiment, in step 210, the UE may receive dynamic signaling that carries a first index corresponding to the RE configuration and is sent by the base station. According to the first index, the UE obtains the RE configuration from an RE configuration set that includes at least one RE configuration, where the at least one RE configuration and the corresponding index may be predefined.

In DPS, the AP that provides data services for the UE may change dynamically between multiple APs, and the RE configuration may also change dynamically. Therefore, the UE may predefine an RE configuration set that includes at least one RE configuration, and then can obtain the RE configuration dynamically in a currently transmitted subframe according to the dynamic signaling sent by the base station. In addition, the RE configuration set is predefined, that is, known to both the base station and the UE, and does not need to be notified by the base station to the UE by using additional higher layer signaling, thereby saving signaling overhead.

Optionally, in another embodiment, after the data symbol is received, the UE may perform demodulation and channel decoding on the data symbol by using the data symbol as a useful data symbol or a useless data symbol. For example, when a data symbol is used as a useless data symbol, the UE may set the data symbol to a fixed value (such as 0), or set the confidence corresponding to the data symbol to 0 or to be infinitesimal.

Optionally, in another embodiment, according to dynamic signaling sent by the base station, the UE may perform demodulation and channel decoding on the data symbol by using the data symbol as a useful data symbol or a useless data symbol, where the dynamic signaling may be used to indicate whether the data symbol is a useful data symbol or a useless data symbol.

Optionally, in another embodiment, the higher layer signaling may include a bitmap code, where bits (bit) in the bitmap code correspond to a pilot pattern of the CSI-RS, and the number of antenna ports corresponding to the pilot pattern of the CSI-RS may be 1, 2, 4, or 8. For example, the value of the bit in the bitmap code is 1, indicating that a data symbol can be mapped onto the corresponding RE; or the value of the bit in the bitmap code is 0, indicating that the data symbol cannot be mapped onto the corresponding RE.

Optionally, in another embodiment, the RE configuration may include a cycle and a subframe offset.

In the embodiment of the present invention, a data symbol can be mapped onto the RE that is used for sending the CSI-RS, so that the UE can receive the data symbol on the RE that is used for sending the CSI-RS, thereby improving the utilization efficiency of the RE.

In addition, in the embodiment of the present invention, the UE receives the CSI-RS and the data symbol that is sent by the base station through different access points on the REs used for sending the CSI-RS, so that the UE can measure interference between different access points according to the received CSI-RS, thereby improving channel quality indicator precision and improving quality of service for the UE and system throughput.

Figure 3:
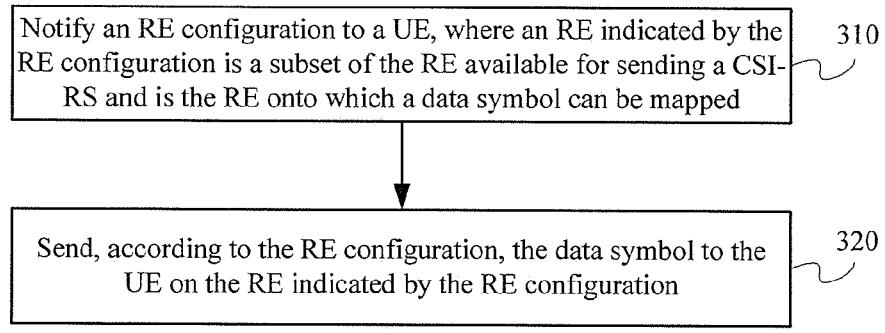
FIG. 3 is a schematic flowchart of a data transmission method according to another embodiment of the present invention.

FIG. 3 is a schematic flowchart of a data transmission method according to another embodiment of the present invention. The method in FIG. 3 is implemented by a base station, for example, by a macro base station 101 in the application scenario in FIG. 1.

310. Notify an RE configuration to a UE, where an RE indicated by the RE configuration is a subset of the RE available for sending a CSI-RS and is the RE onto which a data symbol can be mapped.

The base station may notify one or more RE configurations to the UE, which is not limited by the embodiment of the present invention. The RE indicated by the RE configuration is a subset of the RE available for sending the CSI-RS. The subset here may be a broad-sense subset, that is, the RE indicated by the RE configuration may be a part of REs available for sending the CSI-RS, or all of REs available for sending the CSI-RS, which is not limited by the embodiment of the present invention.

320. Send, according to the RE configuration, the data symbols to the UE on the REs indicated by the RE configuration.

In the embodiment of the present invention, a data symbol can be mapped onto the RE that is used for sending the CSI-RS, so that the UE can receive the data symbol on the RE that is used for sending the CSI-RS, thereby improving the utilization efficiency of the RE.

In a CoMP system, multiple APs may provide data services for one or more UEs simultaneously. For example, AP 1 and AP 2 in FIG. 1 may provide data services for UE 1 and UE 2 simultaneously. The UE that receives a CoMP service may measure a downlink channel between the UE and the AP according to the CSI-RS. In addition, the UE needs to measure interference according to the CSI-RS. However, in the prior art, the UE cannot measure the interference between the APs according to the CSI-RS, which leads to inaccurate interference measurement and affects CQI precision, and further affects quality of service for a user and system throughput.

Optionally, in an embodiment, the base station may send the data symbols to the UE through at least one first AP on the REs indicated by the RE configuration. The base station may send the CSI-RS to the UE through at least one second AP on the REs indicated by the RE configuration, where the at least one first AP and the at least one second AP are multiple coordinated APs in a CoMP system. In this way, according to the CSI-RS, the UE can measure interference caused by the at least one first AP onto the at least one second AP. For example, the UE may compare an expected received value of the CSI-RS with an actual value of the CSI-RS subjected to data symbol interference, and obtain the interference caused by the at least one first AP onto the at least one second AP.

Therefore, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for the UE and system throughput.

Optionally, in another embodiment, in step 310, the base station may send higher layer signaling that carries the RE configuration to the UE. The higher layer signaling may be sent by the base station semi-statically, and there may be one or more pieces of higher layer signaling, which is not limited by the embodiment of the present invention.

Optionally, in another embodiment, in step 310, the base station may send higher layer signaling that carries multiple RE configurations and corresponding indexes to the UE, and send dynamic signaling that carries a first index corresponding to the RE configuration to the UE, where the RE configuration belongs to an RE configuration set that includes multiple RE configurations. The higher layer signaling may be sent by the base station semi-statically, and there may be one or more pieces of higher layer signaling, which is not limited by the embodiment of the present invention.

In DPS, the AP that provides data services for the UE may change dynamically between multiple APs, and the RE configuration may also change dynamically. Therefore, the base station may send one or more pieces of higher layer signaling to the UE semi-statically, so that the UE obtains an RE configuration set. Then, the base station sends the dynamic signaling to the UE, so that the UE can obtain the RE configuration dynamically in a currently transmitted subframe.

Optionally, in another embodiment, in step 310, the base station may send higher layer signaling that carries at least one first RE configuration and a corresponding index to the UE, and send dynamic signaling that carries a first index corresponding to the RE configuration to the UE, where the RE configuration belongs to an RE configuration set that includes at least one first RE configuration and at least one second RE configuration, where the at least one second RE configuration and the corresponding index may be predefined. The at least one first RE configuration and the at least one second RE configuration differ from each other.

In DPS, the AP that provides data services for the UE may change dynamically between multiple APs, and the RE configuration may also change dynamically. Therefore, the base station may send one or more pieces of higher layer signaling to the UE semi-statically, so that the UE can obtain at least one first RE configuration. In addition, at least one second RE configuration known by both the base station and the UE is predefined, so that the UE can obtain an RE configuration set that includes at least one first RE configuration and at least one second RE configuration. Then, the base station sends the dynamic signaling to the UE, so that the UE can obtain the RE configuration dynamically in a currently transmitted subframe. In addition, the at least one second RE configuration is predefined, that is, known to both the base station and the UE, and does not need to be notified to the UE by using additional higher layer signaling, thereby saving signaling overhead.

Optionally, in another embodiment, in step 310, the base station may send dynamic signaling that carries a first index corresponding to the RE configuration to the UE, where the RE configuration belongs to an RE configuration set that includes at least one RE configuration, and the at least one RE configuration and the corresponding index may be predefined.

In DPS, the AP that provides data services for the UE may change dynamically between multiple APs, and the RE configuration may also change dynamically. Therefore, the base station may predefine an RE configuration set that includes at least one RE configuration, and then use the dynamic signaling to instruct the UE to obtain the RE configuration dynamically in a currently transmitted subframe. In addition, the RE configuration set is predefined, that is, known to both the base station and the UE, and does not need to be notified by the base station to the UE by using additional higher layer signaling, thereby saving signaling overhead.

Optionally, in another embodiment, in step 320, the base station may map the data symbol onto the RE indicated by each RE configuration in the RE configuration set; and delete, according to transmission requirements of the CSI-RS, the data symbols mapped onto other RE than the RE indicated by the RE configuration in the RE indicated by each RE configuration.

Optionally, in another embodiment, the higher layer signaling may include a bitmap code, where bits in the bitmap code correspond to a pilot pattern of the CSI-RS, and the number of antenna ports corresponding to the pilot pattern of the CSI-RS is 1, 2, 4, or 8. For example, the value of a bit in the bitmap code is 1, indicating that a data symbol can be mapped onto the corresponding RE; or the value of the bit in the bitmap code is 0, indicating that the data symbol cannot be mapped onto the corresponding RE.

Optionally, in another embodiment, the CSI-RS may be a zero-power CSI-RS or a non-zero-power CSI-RS.

Optionally, in another embodiment, the RE configuration may include a cycle and a subframe offset.

In the embodiment of the present invention, a data symbols can be mapped onto the RE that is used for sending the CSI-RS, so that the UE can receive the data symbol on the RE that is used for sending the CSI-RS, thereby improving the utilization efficiency of the RE.

In addition, in the embodiment of the present invention, the UE receives the CSI-RS and the data symbol that is sent by the base station through different access points on the REs used for sending the CSI-RS, and therefore, the UE can measure interference between different access points according to the received CSI-RS, which improves CQI precision and improves quality of service for the UE and system throughput.

The following describes the embodiments of the present invention in more detail with specific examples.

Figure 4:
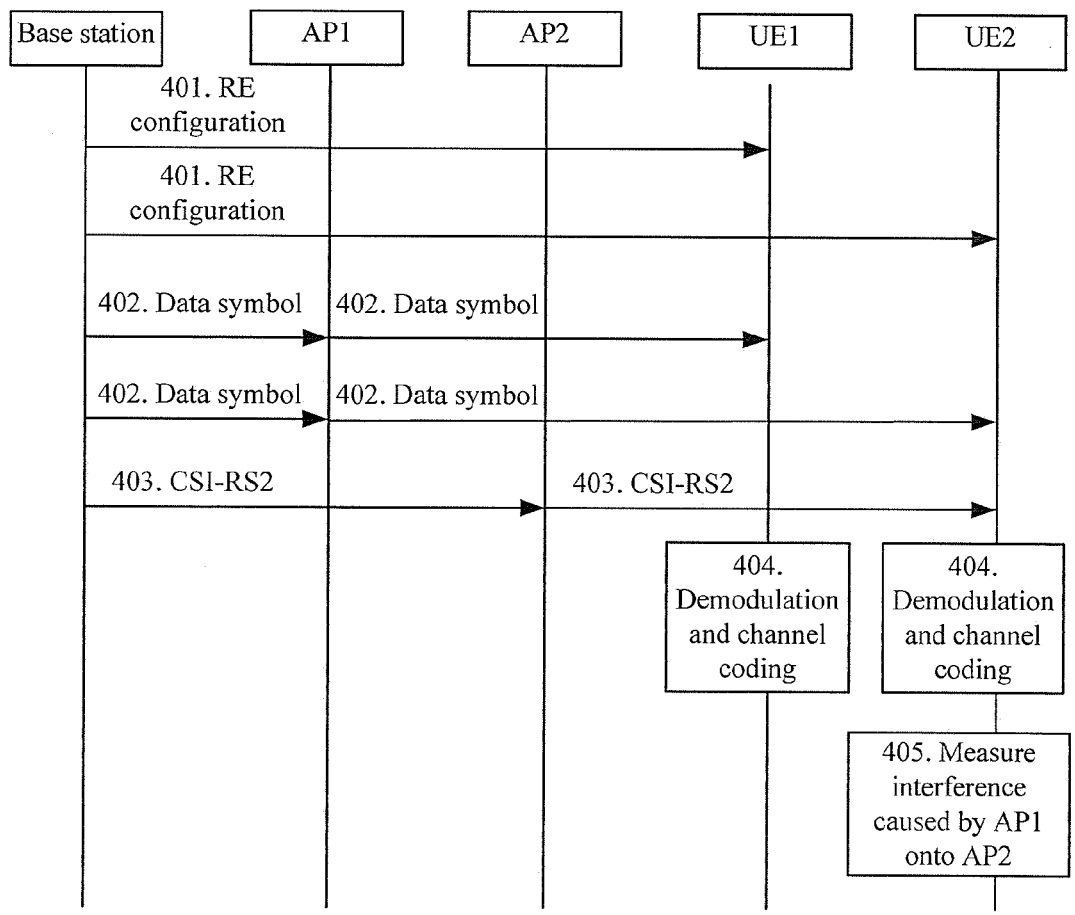
FIG. 4 is a schematic flowchart of a process of a data transmission method according to another embodiment of the present invention.

FIG. 4 is a schematic flowchart of a process of a data transmission method according to another embodiment of the present invention. In FIG. 4, two APs and two UEs are used as examples. Assuming that AP 1 and AP 2 are two coordinated APs in a CoMP system, and UE 1 and UE 2 are in the CoMP system. For example, AP 1, AP 2, UE 1, and UE 2 in the application scenario in FIG. 1 are applied.

401. UE 1 and UE 2 obtain an RE configuration from a base station, where an RE indicated by the RE configuration is a subset of the RE available for sending a CSI-RS and is the RE onto which a data symbol can be mapped.

The CSI-RS may include CSI-RS 1 sent through AP 1 and CSI-RS 2 sent through AP 2. Therefore, the REs for sending the CSI-RS include an RE for sending CSI-RS 1 and an RE for sending CSI-RS 2. The RE configuration may include a cycle and a subframe offset.

Optionally, UE 1 and UE 2 may receive one or more pieces of higher layer signaling semi-statically sent by the base station, and obtain the RE configuration according to the higher layer signaling. For example, the RE indicated by the RE configuration may be the RE for sending CSI-RS 2.

In DPS, the AP that provides data services for UE 1 and UE 2 may change dynamically between AP 1 and AP 2, and therefore, the RE configuration may also change dynamically.

Optionally, UE 1 and UE 2 may receive one or more pieces of higher layer signaling semi-statically sent by the base station, where the higher layer signaling carries an RE configuration set that includes multiple RE configurations and an index corresponding to the multiple RE configurations. UE 1 and UE 2 may receive dynamic signaling that carries an index corresponding to the RE configuration in a currently transmitted subframe and is sent by the base station, and obtain the RE configuration from the RE configuration set.

Optionally, UE 1 and UE 2 may receive one or more pieces of higher layer signaling that carry at least one first RE configuration and a corresponding index and are sent by the base station semi-statically; and, according to dynamic signaling that carries an index corresponding to the RE configuration in a currently transmitted subframe and is sent by the base station, obtain the RE configuration from an RE configuration set that includes at least one first RE configuration and at least one second RE configuration, where the at least one second RE configuration and the corresponding index are predefined by UE 1 and UE 2 and known by the base station, and in this way, the base station may notify the UE semi-statically without using the higher layer signaling, thereby saving signaling overhead.

The higher layer signaling may include a bitmap code, where bits in the bitmap code correspond to a pilot pattern of the CSI-RS, and the number of antenna ports corresponding to the pilot pattern of the CSI-RS may be 1, 2, 4, or 8. The value of a bit in the bitmap code is 1, indicating that the data symbol can be mapped onto the corresponding RE; or the value of the bit in the bitmap code is 0, indicating that the data symbol cannot be mapped onto the corresponding RE.

Optionally, UE 1 and UE 2 may receive dynamic signaling that carries a first index corresponding to the RE configuration and is sent by the base station, and, according to the first index, obtain the RE configuration from an RE configuration set that includes at least one RE configuration, where the at least one RE configuration and the corresponding index may be predefined by UE 1, UE 2, and the base station. Therefore, the base station may notify the UE semi-statically without using the higher layer signaling, thereby saving signaling overhead.

Subsequently, in FIG. 4, it is used as an example for description that the RE indicated by the RE configuration is used for sending CSI-RS 2 and is an RE onto which the data symbol can be mapped.

402. UE 1 and UE 2 receive the data symbol sent by the base station through AP 1 on the RE used for sending CSI-RS 2.

AP 1 can provide data services for UE 1 and/or UE 2. In step 401, the RE indicated by the RE configuration is used for sending CSI-RS 2 and is an RE onto which the data symbol can be mapped. Therefore, the base station may send the data symbol to UE 1 and UE 2 through AP 1 on the RE used for sending CSI-RS 2, thereby improving the utilization efficiency of the RE used for sending CSI-RS 2.

403. UE 2 receives CSI-RS 2 sent by the base station through AP 2 on the RE used for sending CSI-RS 2.

CSI-RS 2 may be zero-power CSI-RS 2 or non-zero-power CSI-RS 2.

404. UE 1 and UE 2 perform demodulation and channel coding on the received data symbol.

UE 1 and UE 2 may use the received data symbol as a useful data symbol or a useless data symbol to undergo demodulation and channel coding. Optionally, by using dynamic signaling, the base station may instruct UE 1 and UE 2 to use the data symbol as a useful data symbol or a useless data symbol.

405. UE 2 measures, according to CSI-RS 2, interference caused by AP 1 onto AP 2.

Because UE 2 receives the data symbol and CSI-RS 2 on the RE used for sending CSI-RS 2, the received CSI-RS 2 is CSI-RS 2 subjected to interference caused by the data symbol sent by AP 1. By comparing the expected received value of CSI-RS 2 with the actual value of CSI-RS 2 subjected to interference, the interference caused by AP 1 onto AP 2 may be measured. In the prior art, however, UE 2 cannot measure the interference caused by AP 1 onto AP 2.

It should be understood that the sequence numbers of the above steps do not mean order of implementation, and the order of implementing the processes should depend on their functions and inherent logics and shall not constitute any limitation to the implementation process of the embodiment of the present invention. For example, step 403 may be performed before step 402.

It should be further understood that the example in FIG. 4 is merely intended for a person skilled in the art to better understand the embodiment of the present invention rather than limiting the scope of the embodiment of the present invention.

In the embodiment of the present invention, a data symbols can be mapped onto the RE that is used for sending the CSI-RS, so that the UE can receive the data symbol on the RE that is used for sending the CSI-RS, thereby improving the utilization efficiency of the RE.

In addition, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

Figure 5A:
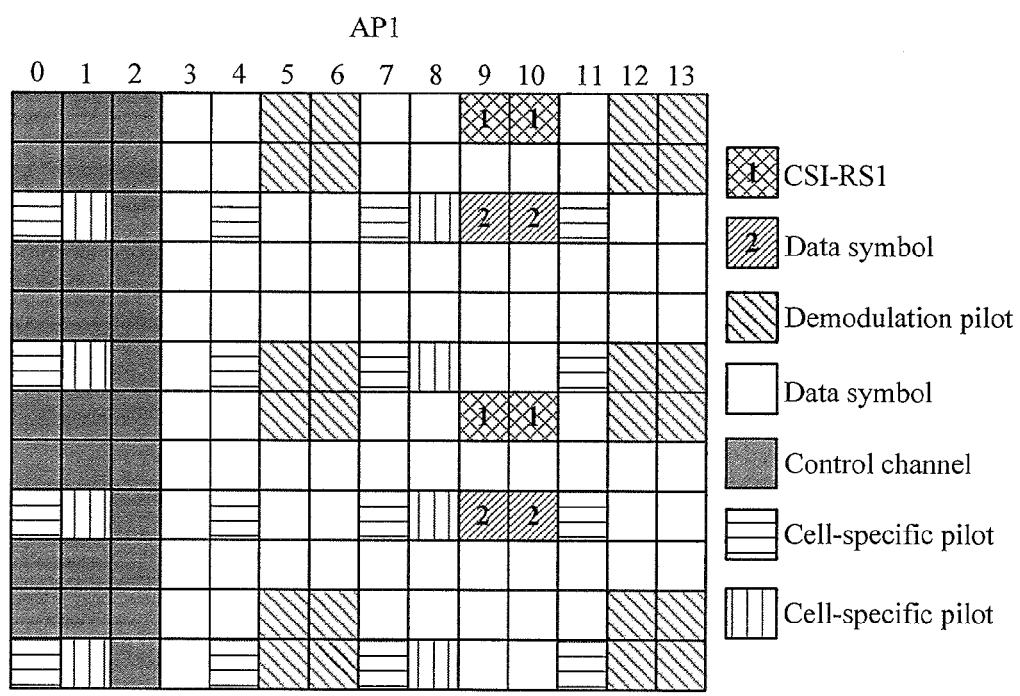
FIG. 5a and FIG. 5b are schematic diagrams of examples of CSI-RS pilot patterns according to another embodiment of the present invention.
Figure 5B:
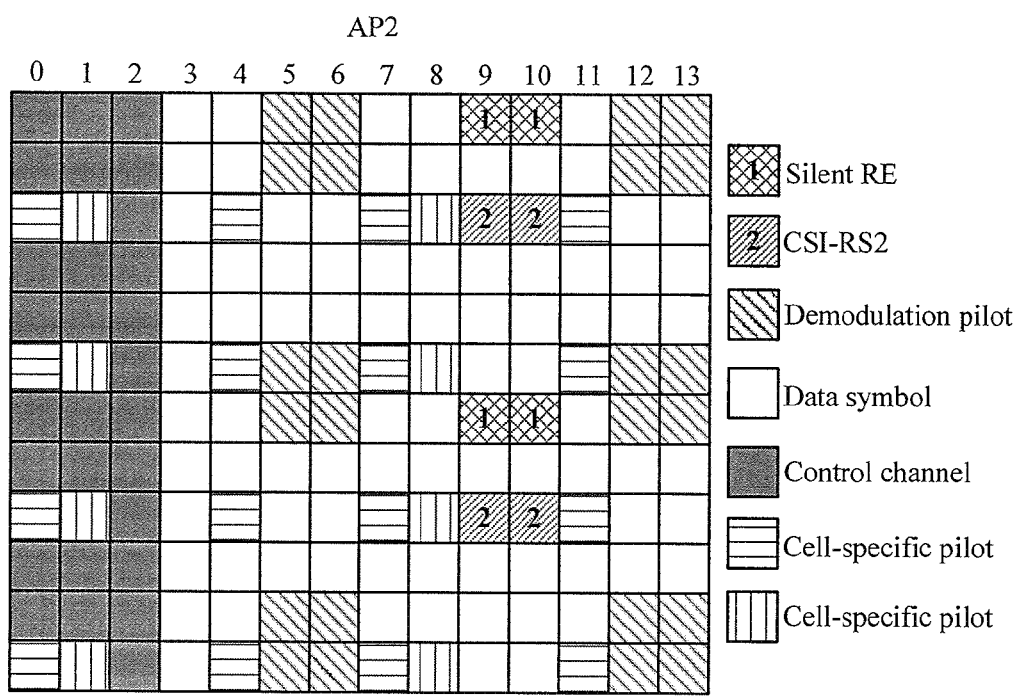

FIG. 5a and FIG. 5b are schematic diagrams of examples of CSI-RS pilot patterns according to another embodiment of the present invention. It is assumed that there are two APs, each AP has four antenna ports, and normal cyclic prefixes (Cyclic Prefix, CP) are applied. Such an assumption is merely for ease of description and does not limit the scope of the embodiment of the present invention. The embodiment of the present invention is also applicable to other numbers of APs, such as two or more APs; and the number of antenna ports of each AP is not limited to 4, and may also be 8 or another number. The embodiment of the present invention is also applicable to an extended CP (Extended CP), and the embodiment of the present invention does not limit the form of the CP.

FIG. 5a is a schematic diagram of an example of a CSI-RS pilot pattern corresponding to AP 1. FIG. 5b is a schematic diagram of an example of a CSI-RS pilot pattern corresponding to AP 2.

For example, AP 1, AP 2, UE 1, and UE 2 in the application scenario in FIG. 1 are applied. In FIG. 5a and FIG. 5b, it is assumed that AP 1 provides data services for UE 1, and AP 2 provides data services for UE 2.

If UE 1 needs to receive a data symbol sent by a base station through AP 1, the UE may obtain an RE configuration according to higher layer signaling sent by the base station, where an RE indicated by the RE configuration is used for sending CSI-RS 2 and is an RE onto which the data symbol can be mapped. Therefore, the base station may send the data symbol to UE 1 through AP 1 on the RE used for sending CSI-RS 2, and therefore, both UE 1 and UE 2 can receive the data symbol sent by the base station through AP 1 on the RE used for sending CSI-RS 2. UE 1 may use the data symbol as a useful data symbol or a useless data symbol to undergo demodulation and channel coding. UE 2 may also receive CSI-RS 2 sent by the base station to UE 2 through AP 2 on the RE used for sending CSI-RS 2, and therefore, UE 2 can measure, according to the received CSI-RS 2 subjected to data symbol interference, the interference caused by AP 1 onto AP 2.

In the embodiment of the present invention, a data symbols can be mapped onto the RE that is used for sending the CSI-RS, so that the UE can receive the data symbol on the RE that is used for sending the CSI-RS, thereby improving the utilization efficiency of the RE.

In addition, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

Figure 6A:
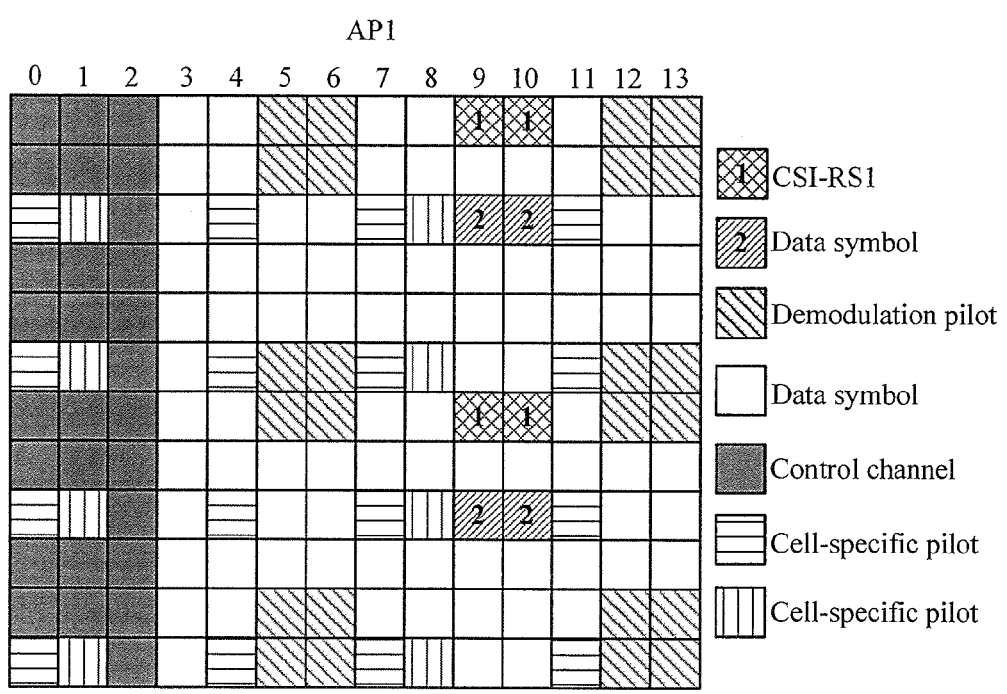
FIG. 6a and FIG. 6b are schematic diagrams of examples of CSI-RS pilot patterns according to another embodiment of the present invention.
Figure 6B:
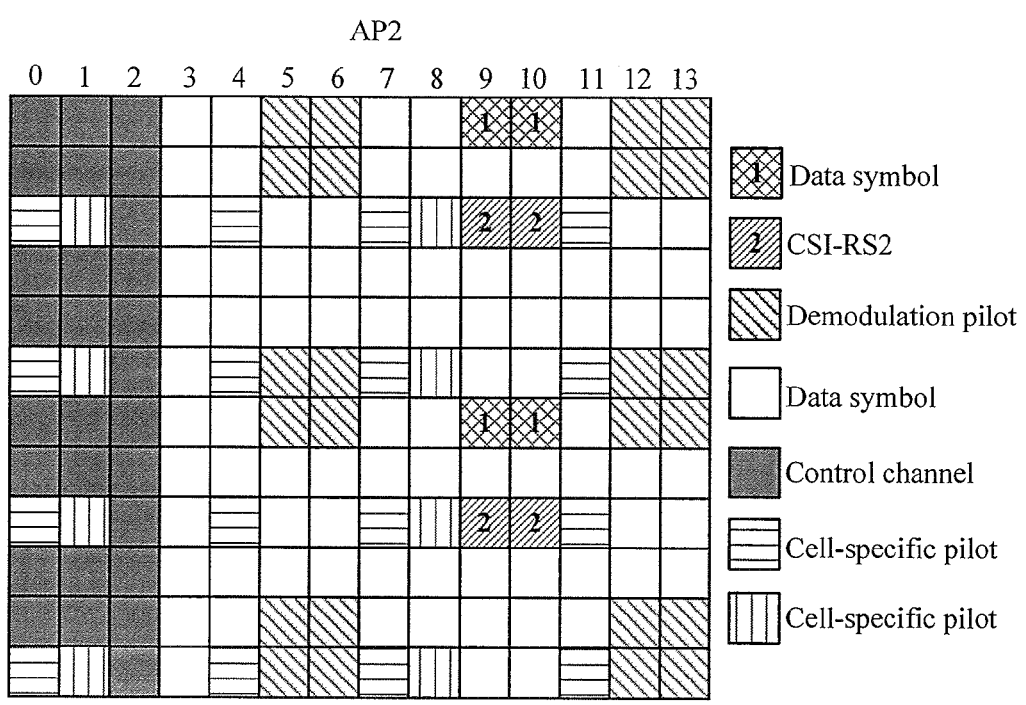

FIG. 6a and FIG. 6b are schematic diagrams of examples of CSI-RS pilot patterns according to another embodiment of the present invention. It is assumed that there are two APs, each AP has four antenna ports, and normal CPs are applied. Such an assumption is merely for ease of description and does not limit the scope of the embodiment of the present invention. The embodiment of the present invention is also applicable to other numbers of APs, such as two or more APs; and the number of antenna ports of each AP is not limited to 4, and may also be 8 or another number. The embodiment of the present invention is also applicable to an extended CP, and the embodiment of the present invention does not limit the form of the CP.

FIG. 6a is a schematic diagram of an example of a CSI-RS pilot pattern corresponding to AP 1. FIG. 6b is a schematic diagram of an example of a CSI-RS pilot pattern corresponding to AP 2.

In DPS, an AP that provides data services for a UE may change dynamically between multiple APs, and an RE configuration may also change dynamically. Therefore, the UE may obtain an RE configuration set by using one or more pieces of higher layer signaling semi-statically sent by the base station, and then obtain the RE configuration in a currently transmitted subframe dynamically according to dynamic signaling sent by a base station.

For example, UE 1 and UE 2 may receive two pieces of higher layer signaling semi-statically sent by the base station, where each piece of higher layer signaling carries an RE configuration and a corresponding index, and therefore, the RE configuration set includes two RE configurations. It is assumed that an RE indicated by the first RE configuration is used for sending CSI-RS 1 and is an RE onto which data symbol can be mapped, and the RE indicated by a second RE configuration is used for sending CSI-RS 2 and is an RE onto which the data symbol can be mapped. UE 1 and UE 2 may obtain the first RE configuration from the RE configuration set according to the index of the first RE configuration, where the index is carried in the dynamic signaling sent by the base station. UE 1 and UE 2 may also obtain the second RE configuration from the RE configuration set according to the index of the second RE configuration, where the index is carried in the dynamic signaling.

For example, AP 1, AP 2, UE 1, and UE 2 in the application scenario in FIG. 1 are applied. In FIG. 6a and FIG. 6b, it is assumed that AP 1 provides data services for UE 1, and AP 2 provides data services for UE 2.

If UE 1 needs to receive the data symbol sent by the base station through AP 1, UE 1 may know, according to the dynamic signaling sent by the base station, that the index corresponding to the RE configuration in the currently transmitted subframe is the index of the second RE configuration, and therefore, know that the RE indicated by the current RE configuration is used for sending CSI-RS 2 and is an RE onto which the data symbol can be mapped. Therefore, the base station may send the data symbol to UE 1 through AP 1 on the RE used for sending CSI-RS 2, and therefore, both UE 1 and UE 2 can receive the data symbol sent by the base station through AP 1 on the RE used for sending CSI-RS 2. UE 1 may use the data symbol as a useful data symbol or a useless data symbol to undergo demodulation and channel coding. UE 2 may also receive CSI-RS 2 sent by the base station through AP 2 on the RE used for sending CSI-RS 2, and therefore, UE 2 can measure, according to the received CSI-RS 2 subjected to data symbol interference, the interference caused by AP 1 onto AP 2.

If UE 2 needs to receive the data symbol sent by the base station through AP 2, UE 2 may know, according to the dynamic signaling sent by the base station, that the index corresponding to the RE configuration in the currently transmitted subframe is the index of the first RE configuration, and therefore, know that the RE indicated by the current RE configuration is used for sending CSI-RS 1 and is an RE onto which the data symbol can be mapped. Therefore, the base station may send the data symbol to UE 2 through AP 2 on the RE used for sending CSI-RS 1, and therefore, both UE 1 and UE 2 can receive the data symbol sent by the base station through AP 2 on the RE used for sending CSI-RS 1. UE 2 may use the data symbol as a useful data symbol or a useless data symbol to undergo demodulation and channel coding. UE 1 may also receive CSI-RS 1 sent by the base station through AP 1 on the RE used for sending CSI-RS 1, and therefore, UE 1 can measure, according to the received CSI-RS 1 subjected to data symbol interference, the interference caused by AP 2 onto AP 1.

In the embodiment of the present invention, a data symbol can be mapped onto the RE that is used for sending the CSI-RS, so that the UE can receive the data symbol on the RE that is used for sending the CSI-RS, thereby improving the utilization efficiency of the RE.

In addition, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

Figure 7A:
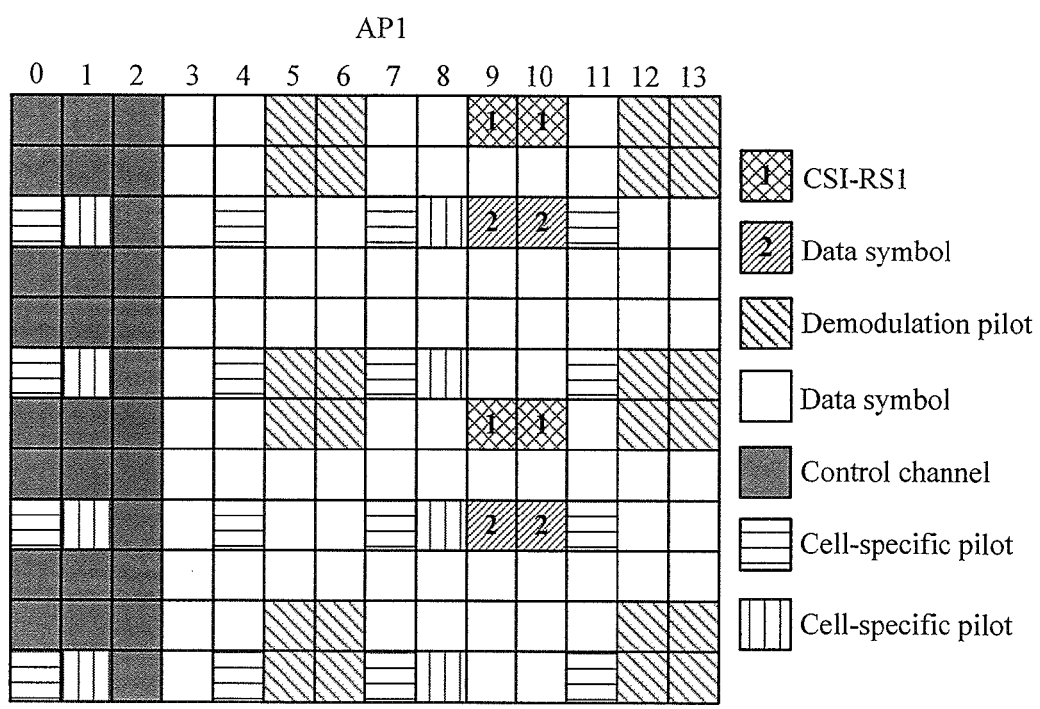
FIG. 7a and FIG. 7b are schematic diagrams of examples of CSI-RS pilot patterns according to another embodiment of the present invention.
Figure 7B:
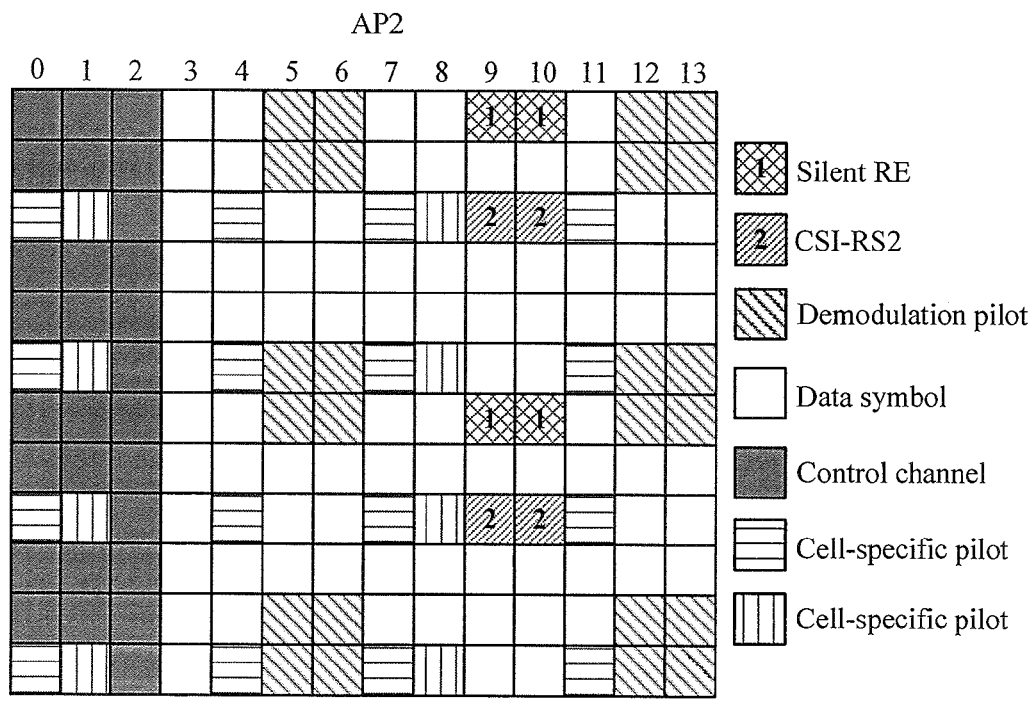

FIG. 7a and FIG. 7b are schematic diagrams of examples of CSI-RS pilot patterns according to another embodiment of the present invention. In FIG. 7a and FIG. 7b, it is assumed that there are two APs, each AP has four antenna ports, and normal CPs are applied. Such an assumption is merely for ease of description and does not limit the scope of the embodiment of the present invention. The embodiment of the present invention is also applicable to other numbers of APs, such as two or more APs; and the number of antenna ports of each AP is not limited to 4, and may also be 8 or another number. The embodiment of the present invention is also applicable to an extended CP (Extended CP), and the embodiment of the present invention does not limit the form of the CP.

FIG. 7a is a schematic diagram of an example of a CSI-RS pilot pattern corresponding to AP 1. FIG. 7b is a schematic diagram of an example of a CSI-RS pilot pattern corresponding to AP 2.

In DPS, an AP that provides data services for a UE may change dynamically between multiple APs, and an RE configuration may also change dynamically. Therefore, the UE may obtain at least one first RE configuration by using one or more pieces of higher layer signaling semi-statically sent by a base station. In addition, at least one second RE configuration and a corresponding index may be predefined by the UE and the base station so that the UE obtains an RE configuration set that includes at least one first RE configuration and at least one second RE configuration. Then, the UE obtains the RE configuration dynamically in a currently transmitted subframe according to dynamic signaling sent by the base station. In addition, the at least one second RE configuration is predefined by the UE and the base station and does not need to be notified by the base station to the UE by using additional higher layer signaling, thereby saving signaling overhead.

For example, UE 1 and UE 2 may receive higher layer signaling semi-statically sent by the base station and carries the first RE configuration and the corresponding index. It is assumed that the RE indicated by the first RE configuration is an RE used for sending CSI-RS 2. In addition, the second RE configuration and the corresponding index are predefined, where the RE indicated by the second RE configuration is an RE used for sending CSI-RS 1 and an RE used for sending CSI-RS 2, but is an RE onto which the data symbol cannot be mapped. The second RE configuration is known by UE 1, UE 2, and the base station.

For example, AP 1, AP 2, UE 1, and UE 2 in the application scenario in FIG. 1 are applied. In FIG. 7a and FIG. 7b, it is assumed that AP 1 provides data services for UE 1, and AP 2 provides data services for UE 2.

If UE 1 needs to receive the data symbol sent by the base station through AP 1, UE 1 may know, according to the dynamic signaling sent by the base station, that the index corresponding to the RE configuration in the currently transmitted subframe is the index of the first RE configuration, and therefore, know that the RE indicated by the current RE configuration is used for sending CSI-RS 2 and is an RE onto which the data symbol can be mapped. Therefore, the base station may send the data symbol to UE 1 through AP 1 on the RE used for sending CSI-RS 2, and therefore, both UE 1 and UE 2 can receive the data symbol sent by the base station through AP 1 on the RE used for sending CSI-RS 2. UE 1 may use the data symbol as a useful data symbol or a useless data symbol to undergo demodulation and channel coding. UE 2 may also receive CSI-RS 2 sent by the base station through AP 2 on the RE used for sending CSI-RS 2, and therefore, UE 2 can measure, according to the received CSI-RS 2 subjected to data symbol interference, the interference caused by AP 1 onto AP 2.

If UE 2 needs to receive the data symbol sent by the base station through AP 2, UE 2 may know, according to the dynamic signaling sent by the base station, that the index corresponding to the RE configuration in the currently transmitted subframe is the index of the second RE configuration, and therefore, know that the RE indicated by the current RE configuration is used for sending CSI-RS 1 and an RE used for sending CSI-RS 2 but is an RE onto which the data symbol cannot be mapped. In this case, UE 1 does not need to measure the interference caused by AP 2 onto AP 1, and therefore, the base station will not send data symbols to UE 2 through AP 2 on the RE used for sending CSI-RS 1 and on the RE used for sending CSI-RS 2.

In the embodiment of the present invention, a data symbol can be mapped onto the RE that is used for sending the CSI-RS, so that the UE can receive the data symbol on the RE that is used for sending the CSI-RS, thereby improving the utilization efficiency of the RE.

In addition, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

Figure 8:
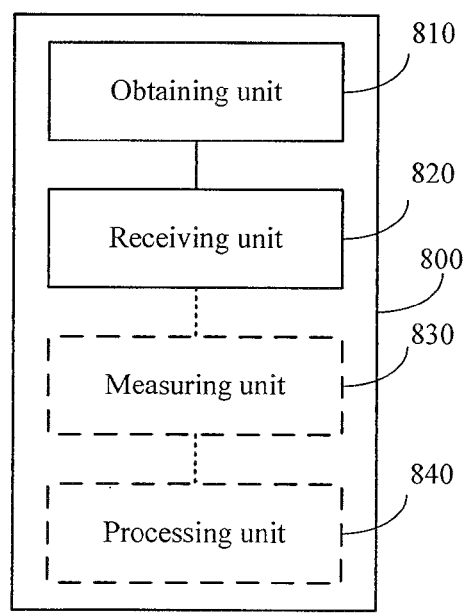
FIG. 8 is a block diagram of a user equipment according to an embodiment of the present invention.

FIG. 8 is a block diagram of a user equipment according to an embodiment of the present invention. An example of the user equipment in FIG. 8 may be UE 1 or UE 2 in FIG. 1. The user equipment 800 includes an obtaining unit 810 and a receiving unit 820.

The obtaining unit 810 obtains an RE configuration, where an RE indicated by the RE configuration is a subset of the RE available for sending a CSI-RS and is the RE onto which a data symbol can be mapped. The receiving unit 820 receives, according to the RE configuration, the data symbol that is sent by a base station on the RE indicated by the RE configuration.

In the embodiment of the present invention, a data symbol can be mapped onto the RE that is used for sending the CSI-RS, so that the UE can receive the data symbol on the RE that is used for sending the CSI-RS, thereby improving the utilization efficiency of the RE.

For other functions and operations of the user equipment 800, reference may be made to the UE-related process in the method embodiments shown in FIG. 2, FIG. 4, FIG. 5, FIG. 6a, FIG. 6b, FIG. 7a, and FIG. 7b. To avoid repetition, no repeated description is given here any further.

Optionally, in an embodiment, the user equipment 800 may further include a measuring unit 830. The receiving unit 820 may receive the data symbol that is sent by the base station through at least one first AP on the REs indicated by the RE configuration. The receiving unit 820 may further receive the CSI-RS that is sent by the base station through at least one second AP on the REs indicated by the RE configuration, where the at least one first AP and the at least one second AP are multiple coordinated APs in a CoMP system. The measuring unit 830 may measure, according to the CSI-RS, interference caused by the at least one first AP onto the at least one second AP.

Therefore, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

Optionally, in another embodiment, the obtaining unit 810 may receive higher layer signaling that carries the RE configuration and is sent by the base station, and obtain the RE configuration according to the higher layer signaling, or, the obtaining unit 810 may obtain the RE configuration that is predefined.

Optionally, in another embodiment, the obtaining unit 810 may receive higher layer signaling that carries multiple RE configurations and corresponding indexes and is sent by the base station; receive dynamic signaling that carries a first index corresponding to the RE configuration and is sent by the base station; and obtain the RE configuration from an RE configuration set that includes the multiple RE configurations according to the first index.

Optionally, in another embodiment, the obtaining unit 810 may receive higher layer signaling that carries at least one first RE configuration and a corresponding index and is sent by the base station, receive dynamic signaling that carries a first index corresponding to the RE configuration and is sent by the base station, and obtain, according to the first index, the RE configuration from an RE configuration set that includes at least one first RE configuration and at least one second RE configuration, where the at least one second RE configuration and the corresponding index are predefined. The at least one second RE configuration is predefined, that is, known to both the base station and the UE, and does not need to be notified by the base station to the UE by using higher layer signaling, thereby saving signaling overhead.

Optionally, in another embodiment, the obtaining unit 810 may receive dynamic signaling that carries a first index corresponding to the RE configuration and is sent by the base station, and obtain, according to the first index, the RE configuration from an RE configuration set that includes at least one RE configuration, where the at least one RE configuration and the corresponding index may be predefined. The RE configuration set is predefined, that is, known to both the base station and the UE, and does not need to be notified by the base station to the UE by using higher layer signaling, thereby saving signaling overhead.

Optionally, in another embodiment, the user equipment 800 may include a processing unit 840 which performs demodulation and channel decoding on the data symbol by using the data symbol as a useful data symbol or a useless data symbol.

Optionally, in another embodiment, the processing unit 840 may perform demodulation and channel decoding on the data symbol by using, according to dynamic signaling sent by the base station, the data symbol as a useful data symbol or a useless data symbol, where the dynamic signaling is used to indicate whether the data symbol is a useful data symbol or a useless data symbol.

Optionally, in another embodiment, the higher layer signaling may include a bitmap code, where bits in the bitmap code correspond to a pilot pattern of the CSI-RS, and the number of antenna ports corresponding to the pilot pattern of the CSI-RS is 1, 2, 4, or 8.

Optionally, in another embodiment, the CSI-RS may be a zero-power CSI-RS or a non-zero-power CSI-RS.

Optionally, in another embodiment, the RE configuration may include a cycle and a subframe offset.

In the embodiment of the present invention, a data symbol can be mapped onto the RE that is used for sending the CSI-RS, so that the UE can receive the data symbol on the RE that is used for sending the CSI-RS, thereby improving the utilization efficiency of the RE.

In addition, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

Figure 9:
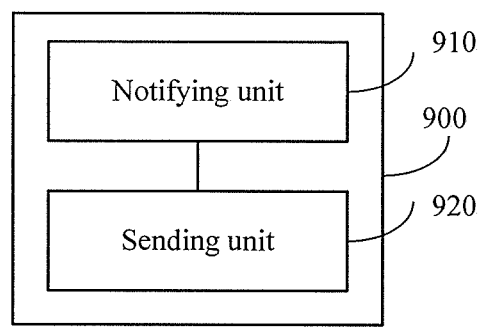
FIG. 9 is a block diagram of a base station according to an embodiment of the present invention.

FIG. 9 is a block diagram of a base station according to an embodiment of the present invention. An example of base station 900 in FIG. 9 may be a macro base station 101 in FIG. 1. The base station 900 includes a notification unit 910 and a sending unit 920.

The notification unit 910 notifies an RE configuration to the UE, where an RE indicated by the RE configuration is a subset of the RE available for sending a CSI-RS and is the RE onto which a data symbol can be mapped. The sending unit 920 sends, according to the RE configuration, the data symbols to the UE on the REs indicated by the RE configuration.

In the embodiment of the present invention, a data symbols can be mapped onto the RE that is used for sending the CSI-RS, so that the UE can receive the data symbol on the RE that is used for sending the CSI-RS, thereby improving the utilization efficiency of the RE.

For other functions and operations of the base station 900, reference may be made to the base station-related process in the method embodiments shown in FIG. 3, FIG. 4, FIG. 5, FIG. 6a, FIG. 6b, FIG. 7a, and FIG. 7b. To avoid repetition, no repeated description is given here any further.

Optionally, in an embodiment, the sending unit 910 may send the data symbols to the UE through at least one first AP on the REs indicated by the RE configuration. The sending unit 910 may further send the CSI-RS to the UE through at least one second AP on the REs indicated by the RE configuration, where the at least one first AP and the at least one second AP are multiple coordinated APs in a CoMP system. In this way, the UE can measure, according to the CSI-RS, interference caused by the at least one first AP onto the at least one second AP.

Therefore, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

Optionally, in another embodiment, the notification unit 910 may send higher layer signaling that carries the RE configuration to the UE.

Optionally, in another embodiment, the notification unit 910 may send higher layer signaling that carries multiple RE configurations and corresponding indexes to the UE, and send dynamic signaling that carries a first index corresponding to the RE configuration to the UE, where the RE configuration belongs to an RE configuration set that includes multiple RE configurations.

Optionally, in another embodiment, the notification unit 910 may send higher layer signaling that carries at least one first RE configuration and a corresponding index to the UE, and send dynamic signaling that carries a first index corresponding to the RE configuration to the UE, where the RE configuration belongs to an RE configuration set that includes at least one first RE configuration and at least one second RE configuration, where the at least one second RE configuration and the corresponding index are predefined. The at least one second RE configuration is predefined, that is, known to both the base station and the UE, and does not need to be notified by the base station to the UE by using higher layer signaling, thereby saving signaling overhead.

Optionally, in another embodiment, the notification unit 910 may send dynamic signaling that carries a first index corresponding to the RE configuration to the UE, where the RE configuration belongs to an RE configuration set that includes at least one RE configuration, and the at least one RE configuration and the corresponding index may be predefined. The RE configuration set is predefined, that is, known to both the base station and the UE, and does not need to be notified by the base station to the UE by using higher layer signaling, thereby saving signaling overhead.

Optionally, in another embodiment, the sending unit 920 may map the data symbol onto the RE indicated by each RE configuration in the RE configuration set; and delete, according to transmission requirements of the CSI-RS, the data symbol mapped onto other RE than the RE indicated by the RE configuration in the RE indicated by each RE configuration.

Optionally, in another embodiment, the higher layer signaling may include a bitmap code, where bits in the bitmap code correspond to a pilot pattern of the CSI-RS, and the number of antenna ports corresponding to the pilot pattern of the CSI-RS is 1, 2, 4, or 8.

Optionally, in another embodiment, the CSI-RS may be a zero-power CSI-RS or a non-zero-power CSI-RS.

Optionally, in another embodiment, the RE configuration may include a cycle and a subframe offset.

In the embodiment of the present invention, a data symbol can be mapped onto the RE that is used for sending the CSI-RS, so that the UE can receive the data symbol on the RE that is used for sending the CSI-RS, thereby improving the utilization efficiency of the RE.

In addition, in the embodiment of the present invention, the UE receives the CSI-RS and the data symbol that is sent by the base station through different access points on the REs used for sending the CSI-RS, so that the UE can measure interference between different access points according to the received CSI-RS, thereby improving CQI precision and improving quality of service for a user and system throughput.

The communication system according to the embodiment of the present invention may include the user equipment 800 or the base station 900.

A person of ordinary skill in the art may be aware that, with reference to the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to the corresponding process in the foregoing method embodiments, and no repeated description is given here any further.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is to say, may be located in one position, or may be distributed on a plurality of network units. A part or all of the units may be selected as required to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, by a terminal device from a base station, higher layer signaling that carries multiple resource element (RE) configurations and indexes respectively identifying the multiple RE configurations;
   receiving, by the terminal device from the base station, dynamic signaling that carries a first index among the indexes;
   identifying, by the terminal device according to the first index carried in the dynamic signaling, at least one RE configuration from the multiple RE configurations, wherein an RE indicated by the at least one RE configuration is a subset of REs available for a channel state information reference signal (CSI-RS), and wherein a data symbol can be mapped onto the subset of REs for the CSI-RS and the CSI-RS is a zero-power CSI-RS; and
   receiving, by the terminal device from the base station, according to the at least one RE configuration, the data symbol on the subset of REs for the zero-power CSI-RS.

2. An apparatus, comprising:
   a processor coupled with a non-transitory storage medium storing executable instructions; wherein the executable instructions, when executed by the processor, cause the apparatus to:
   receive higher layer signaling that carries multiple resource element (RE) configurations and indexes respectively identifying the multiple RE configurations;
   receive dynamic signaling that carries a first index among the indexes;
   identify, according to the first index carried in the dynamic signaling, at least one RE configuration from the multiple RE configurations, wherein an RE indicated by the first RE configuration is a subset of REs available for a channel state information reference signal (CSI-RS) and wherein a data symbol can be mapped onto the subset of REs for the CSI-RS and the CSI-RS is a zero-power CSI-RS; and
   receiving, according to the at least one RE configuration, the data symbol on the subset of REs for the zero-power CSI-RS.

3. A terminal device, comprising: a processor coupled with a transceiver, wherein
   the transceiver is configured to: receive, from a base station, higher layer signaling that carries multiple resource element (RE) configurations and indexes respectively identifying the multiple RE configurations; and receive, from the base station, dynamic signaling that carries a first index among the indexes;
   the processor is configured to: identify, according to the first index carried in the dynamic signaling, at least one RE configuration from the multiple RE configurations, wherein an RE indicated by the at least one RE configuration is a subset of REs available for a channel state information reference signal (CSI-RS) and wherein a data symbol can be mapped onto the subset of REs for the CSI-RS and the CSI-RS is a zero-power CSI-RS; and
   the transceiver is further configured to: receiving, according to the at least one RE configuration, the data symbol on the subset of REs for the zero-power CSI-RS.

4. A non-transitory computer-readable storage medium comprising instructions which, when executed by a computer, cause the computer to carry out the steps of:
   receiving higher layer signaling that carries multiple resource element (RE) configurations and indexes respectively identifying the multiple RE configurations;
   receiving dynamic signaling that carries a first index among the indexes;
   identifying, by the terminal device according to the first index carried in the dynamic signaling, at least one RE configuration from the multiple RE configurations, wherein an RE indicated by the at least one RE configuration is a subset of REs available for a channel state information reference signal (CSI-RS), and wherein a data symbol can be mapped onto the subset of REs for the CSI-RS and the CSI-RS is a zero-power CSI-RS; and
   receiving, according to the at least one RE configuration, the data symbol on the subset of REs for the zero-power CSI-RS.

* * * * *